United States Patent
Kresse et al.

(10) Patent No.: US 6,202,021 B1
(45) Date of Patent: Mar. 13, 2001

(54) SYSTEM FOR TEMPORARILY INCREASING MAXIMUM ROAD SPEED OF A VEHICLE DRIVEN BY AN INTERNAL COMBUSTION ENGINE

(75) Inventors: John P. Kresse, Shelbyville; W. Patrick Niehus, Columbus, both of IN (US)

(73) Assignee: Cummins Engine Company, Inc., Columbus, IN (US)

(*) Notice: Subject to any disclaimer, the term of this patent is extended or adjusted under 35 U.S.C. 154(b) by 0 days.

(21) Appl. No.: 09/535,352

(22) Filed: Mar. 24, 2000

Related U.S. Application Data

(63) Continuation of application No. 09/086,927, filed on May 28, 1998, now Pat. No. 6,134,499.

(51) Int. Cl.[7] .................................................. F16H 61/02
(52) U.S. Cl. .................................................. 701/93; 701/91
(58) Field of Search .............................. 701/93, 94, 96, 701/84, 85, 86, 91

(56) References Cited

U.S. PATENT DOCUMENTS

| | | | |
|---|---|---|---|
| 3,665,390 | 5/1972 | Lee | 304/441 |
| 4,166,514 | 9/1979 | deFreminville et al. | 180/167 |
| 4,177,516 | 12/1979 | Mason | 701/101 |
| 4,375,207 | 3/1983 | Sieber et al. | 123/333 |
| 4,386,688 | 6/1983 | Sato | 477/92 |
| 4,853,720 | 8/1989 | Onari et al. | 701/110 |
| 4,884,669 | 12/1989 | Ehrlinger | 192/216 |
| 4,887,684 | 12/1989 | King | 180/179 |
| 4,890,231 | 12/1989 | Frantz | 701/97 |
| 4,899,623 | 2/1990 | Wokan et al. | 477/111 |
| 5,048,631 | 9/1991 | Etoh | 180/179 |
| 5,096,015 | 3/1992 | Akioshino et al. | 180/179 |
| 5,393,277 | 2/1995 | White et al. | 477/108 |
| 5,401,223 | 3/1995 | White et al. | 477/108 |
| 5,485,381 | 1/1996 | Heintz et al. | 701/93 |
| 5,552,985 | 9/1996 | Hori | 701/93 |

*Primary Examiner*—Tan Nguyen
(74) *Attorney, Agent, or Firm*—Baker & Daniels

(57) ABSTRACT

A road speed control system for a vehicle driven by an internal combustion engine includes a control computer operable to control engine fueling based on inputs from at least an accelerator pedal position sensor, a vehicle speed signal, and at least one control signal. According to one aspect of the invention, the control computer is responsive to a first control signal to decrease the maximum road speed limit value and to a second control signal to increase the maximum road speed value, to thereby provide a road speed limiting system operable under manual engine fueling conditions. According to another aspect of the invention, the control computer is responsive to at least one control signal to activate a maximum road speed limit override feature for temporarily increasing the maximum road speed limit value to, for example, facilitate passing attempts.

19 Claims, 10 Drawing Sheets

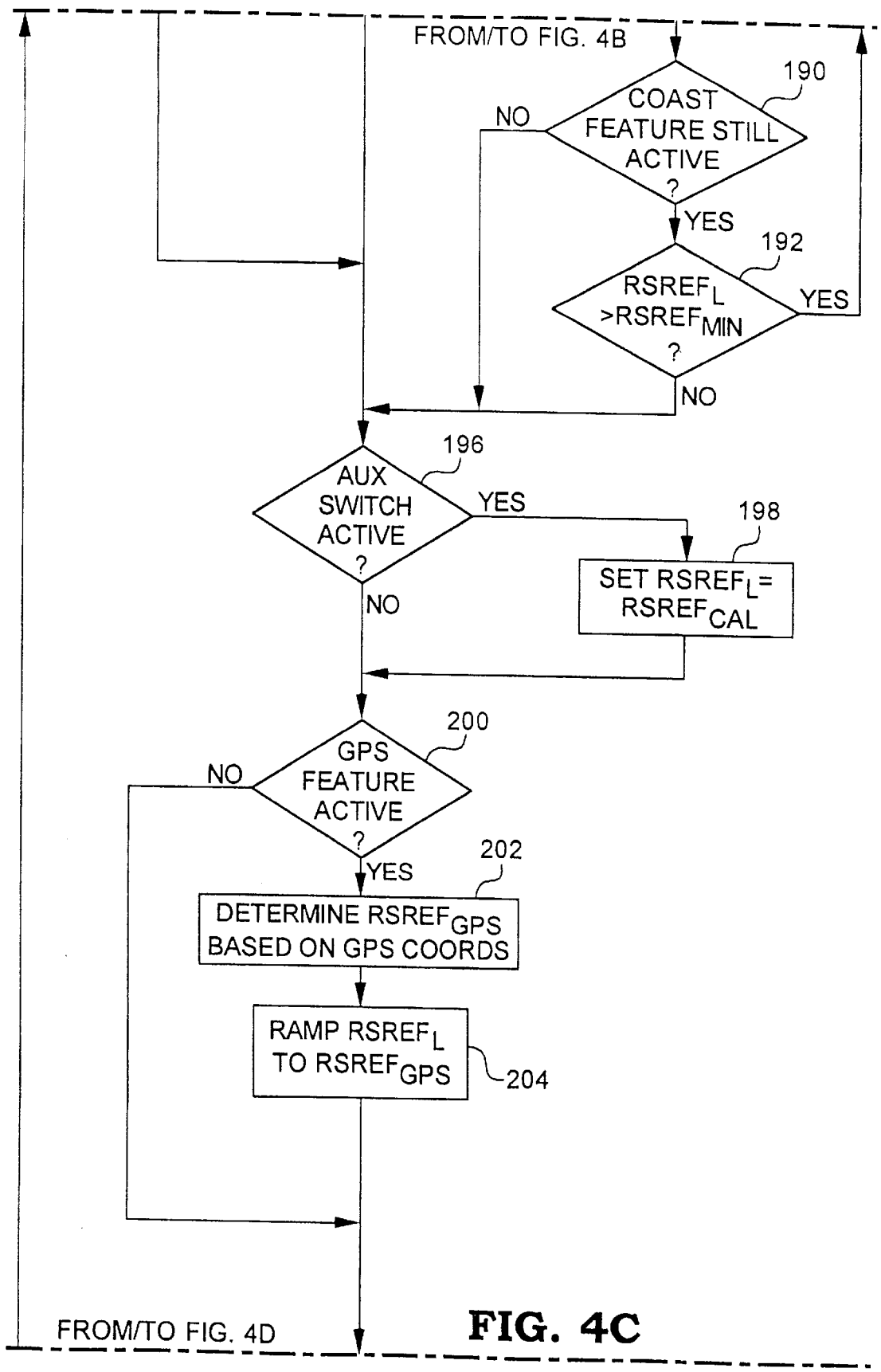

SYSTEM FOR TEMPORARILY INCREASING MAXIMUM ROAD SPEED OF A VEHICLE DRIVEN BY AN INTERNAL COMBUSTION ENGINE

CROSS-REFERENCE TO RELATED U.S. APPLICATION

This is a continuation of U.S. patent application Ser. No. 09/086,927, filed May 28, 1998 and entitled SYSTEM FOR CONTROLLING ROAD SPEED OF A VEHICLE DRIVEN BY AN INTERNAL COMBUSTION ENGINE now U.S. Pat. No. 6,134,499.

FIELD OF THE INVENTION

The present invention relates generally to systems for controlling road speed of a vehicle driven by an internal combustion engine, and more specifically to such systems for controlling maximum road speed under manual throttle control of the engine.

BACKGROUND OF THE INVENTION

Road speed governing systems are generally known in the automotive and heavy duty truck industries. Such systems are typically computer controlled wherein a control computer is responsive to a present vehicle speed signal to limit engine fueling signals to thereby limit vehicle speed to a programmed maximum road speed limit. An example of a portion of one prior art engine and road speed governing control system is illustrated in FIG. 2.

Referring to FIG. 2, the prior art engine and road speed governing control system includes a control computer 5, typically referred to as an Engine Control Module (ECM), Engine Control Unit (ECU) or the like. Control computer 5 receives engine/vehicle operating signals from a number of sensors and other electrical components such as, for example, an accelerator pedal signal via signal path 24, an engine speed signal via signal path 32 and a vehicle speed signal via signal path 36. Control computer 5 is responsive to at least the foregoing signals to produce one or more fuel command signals, via signal path 58, for controlling a fuel system of an internal combustion engine.

Control computer 5 includes a fuel request calculation block 80 receiving the accelerator pedal signal via signal path 24, wherein block 80 is operable to compute an engine speed reference value ESREF therefrom and provide the ESREF value to a summing node Σ. The summing node Σ subtracts the ESREF signal from the engine speed signal supplied thereto via signal path 32, and produces a corresponding error signal which is supplied to an engine speed governor 82. Gov 82 may be any one of a variety of known engine speed governors such as a PID, all-speed or other known engine speed governor. Gov 82 produces an engine speed governor fuel command signal ESG FUEL, which corresponds to engine fueling conditions required to achieve the desired engine speed, and supplies the ESG fuel value to one input of a MIN block 84.

Control computer 5 further includes a road speed governor (RSG) 86 which includes a max road speed block 88 representing a programmed maximum road speed value, RSREF, stored within control computer 5. The maximum road speed value RSREF is supplied to a road speed limiter (RSL) 90 which also receives the vehicle speed signal supplied thereto via signal path 36. RSL 90 produces a road speed governor fuel command signal RSG FUEL, and supplies the RSG fuel value to a second input of MIN block 84. The output of MIN block 84 provides the fuel command signal, FUEL COMMAND, on signal path 58.

In operation, RSL 90 is operable to compare the vehicle speed signal with RSREF, and if vehicle speed is less than RSREF, RSL 90 produces a maximum fuel command as the RSG FUEL value on signal path 92. In this case, MIN block 84 is correspondingly operable to produce the ESG FUEL value on signal path 58 as the commanded fueling signal FUEL COMMAND. If, on the other hand, the vehicle speed signal exceeds RSREF, RSL 90 produces an RSL FUEL command as the RSG FUEL value on signal path 92, wherein the RSL FUEL command corresponds to engine fueling conditions in which actual vehicle speed is limited to the maximum road speed value RSREF. Since RSG FUEL will typically be less than ESG FUEL under such road speed limiting conditions, the FUEL COMMAND signal produced by MIN block 84 will accordingly be equal to RSG FUEL.

While road speed governing systems such as that just described have been extensively used in the automotive and heavy duty truck industries, they have certain drawbacks associated therewith. For example, while cruise control systems are often used by drivers as a technique for automatically limiting vehicle speed to a desired road speed, no such mechanism exists for limiting vehicle speed to a desired road speed under manual fueling conditions (typically via an accelerator pedal). As another example, fleet owners/managers typically set the maximum road speed value at or near a maximum speed limit likely to be encountered by the vehicle. Accordingly, passing another vehicle can be difficult, and sometimes dangerous, if vehicle speed is limited to the maximum road speed value during such passing attempts. This is particularly true when both vehicles involved in a passing maneuver have identically matched maximum road speed values, since the vehicles will actually be limited to different maximum road speed values due to mechanical differences therebetween (e.g. tire wear, etc.).

What is therefore needed is an improved road speed control system which overcomes the drawbacks associated with prior art road speed governing systems. Such an improved road speed control system should ideally allow the driver to adjust the maximum road speed value within some range of road speeds, and should further allow the driver to over-ride the maximum road speed value, at least temporarily, to facilitate the passing of another vehicle.

SUMMARY OF THE INVENTION

The foregoing shortcomings of the prior art are addressed by the present invention. In accordance with one aspect of the present invention, a system for controlling road speed of a vehicle driven by an internal combustion engine comprises an accelerator pedal producing an accelerator pedal signal in response to manual actuation thereof, a fuel system associated with an internal combustion engine, the fuel system supplying fuel to the engine in accordance with a fuel signal provided thereto, means responsive to the accelerator pedal signal for producing the fueling signal, means for producing a first control signal, means for sensing vehicle speed and producing a vehicle speed signal corresponding thereto, and a road speed governor having a maximum road speed value associated therewith, the road speed governor responsive to the vehicle speed signal to limit the fuel signal to thereby limit vehicle speed to the maximum road speed value, the road speed governor responsive to the first control signal to decrease the maximum road speed value to a lesser road speed value.

In accordance with another aspect of the present invention, a method of controlling road speed of a vehicle driven by an internal combustion engine, comprising the steps of producing a fueling signal in response to manual actuation of an accelerator pedal, fueling an internal combustion engine in accordance with the fueling signal, sensing vehicle speed and producing a vehicle speed signal corresponding thereto, comparing the vehicle speed signal to a maximum road speed value, producing a fuel limiting value in response to the vehicle speed signal exceeding the maximum road speed value, limiting the fueling signal to the fuel limiting value to thereby limit vehicle road speed to the maximum road speed value, and decreasing the maximum road speed value to a lesser road speed value in response to a first control signal.

In accordance with a further aspect of the present invention, a system for controlling road speed of a vehicle driven by an internal combustion engine comprises an accelerator pedal producing an accelerator pedal signal in response to manual actuation thereof, a fuel system associated with an internal combustion engine, the fuel system supplying fuel to the engine in accordance with a fuel signal provided thereto, means responsive to the accelerator pedal signal for producing the fueling signal, means for producing a control signal, means for sensing vehicle speed and producing a vehicle speed signal corresponding thereto, and a road speed governor having a maximum road speed value associated therewith, the road speed governor responsive to the vehicle speed signal to limit the fuel signal to thereby limit vehicle speed to the maximum road speed value, the road speed governor responsive to the control signal to increase the maximum road speed value to a greater road speed value if the accelerator pedal signal is greater than a threshold value.

In accordance with yet another aspect of the present invention, a method of controlling road speed of a vehicle driven by an internal combustion engine, comprising the steps of producing a fueling signal in response to manual actuation of an accelerator pedal, fueling an internal combustion engine in accordance with said fueling signal, sensing vehicle speed and producing a vehicle speed signal corresponding thereto, comparing the vehicle speed signal to a maximum road speed value, producing a fuel limiting value in response to the vehicle speed signal exceeding the maximum road speed value, limiting the fueling signal to the fuel limiting value to thereby limit vehicle road speed to the maximum road speed value, and increasing the maximum road speed value to a greater road speed value in response to a control signal if actuation of the accelerator pedal exceeds an accelerator pedal threshold.

One object of the present invention is to provide an improved road speed governing system operable to control the maximum road speed of a vehicle driven by an internal combustion engine.

Another object of the present invention is to provide a road speed limiting system responsive to driver initiated control signals to decrease the maximum road speed of the road speed limiting system under manual fueling control.

A further object of the present invention is to provide a road speed limiting system responsive to driver initiated control signals to temporarily increase the maximum road speed of the road speed limiting system under manual fueling control.

These and other objects of the present invention will become more apparent from the following description of the preferred embodiment.

DESCRIPTION OF THE PREFERRED EMBODIMENTS

Figure 1:
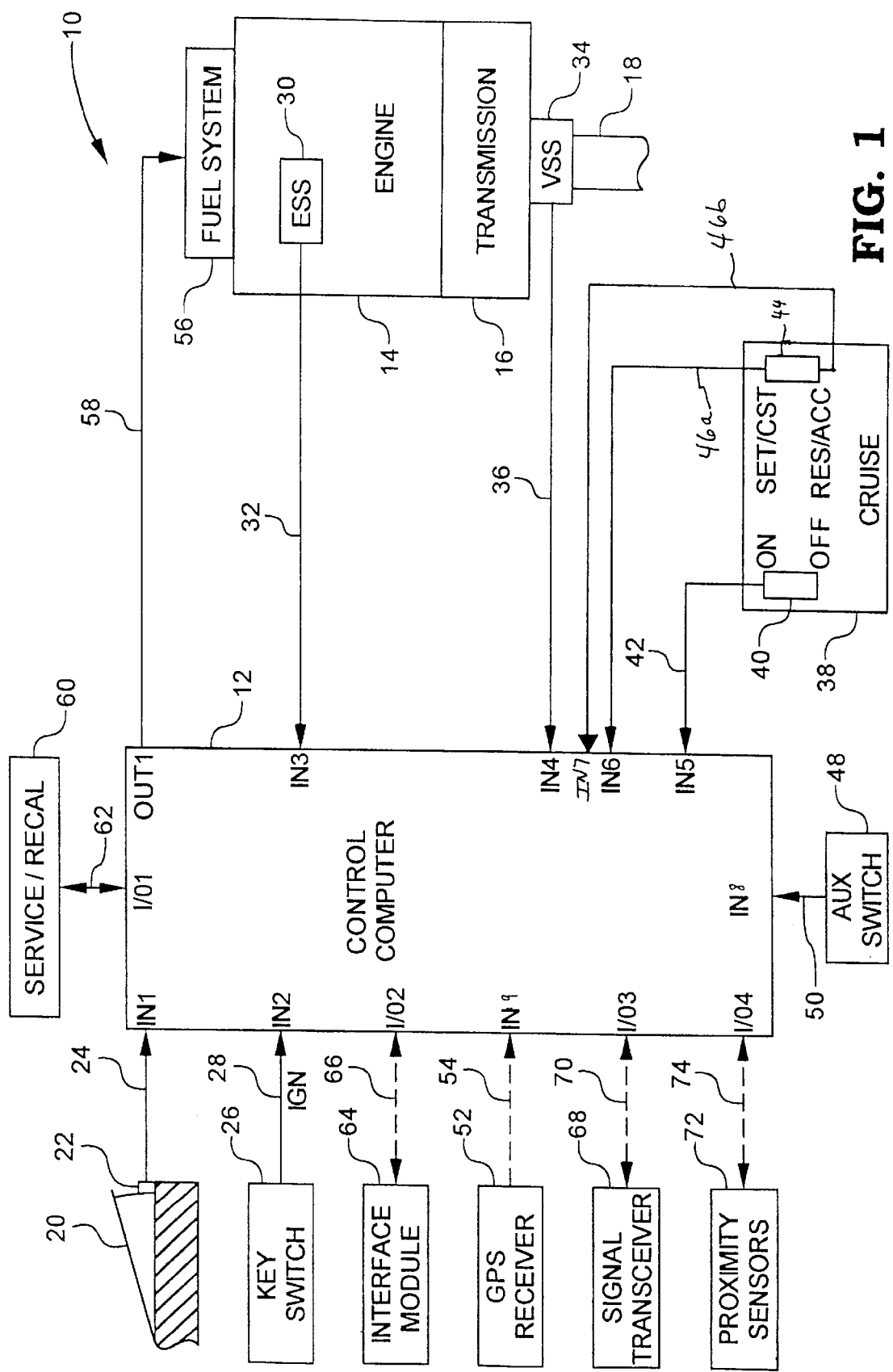
FIG. 1 is a diagrammatic illustration of a system for controlling road speed of a vehicle driven by an internal combustion engine, in accordance with the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, one preferred embodiment of a road speed control system 10, in accordance with the present invention, is shown. System 10 includes a control computer 12 which is operable to control an engine 14 and a transmission 16 connected thereto, as is known in the art. Control computer 12 is often referred to as an engine control module (ECM), engine control unit (ECU) or the like, and is preferably microprocessor-based. Control computer 12 is operable, as is well known in the art, to control and manage many vehicular operations, such as those associated with the operation of the engine 14 and transmission 16, in accordance with software algorithms and operational data typically stored therein.

Many engine/vehicle sensors, switches and other vehicle/engine components interface with control computer 12 during the operation thereof, and some examples of such components, as they relate to the present invention, are illustrated in FIG. 1. For example, system 10 includes an accelerator pedal 20 having a pedal position sensor 22 associated therewith which is electrically connected to input IN1 of control computer 12 via signal path 24. Pedal position sensor 22 is responsive to the position of accelerator pedal 20 to provide an accelerator pedal position signal to control computer 12 via input IN1. In one embodiment, the accelerator pedal position sensor 22 is a potentiometer connected at one end to a suitable voltage and at an opposite end to ground potential. The wiper of such a potentiometer is mechanically coupled to the accelerator pedal 20, as is known in the art, and is electrically connected to signal path 24 so that the voltage present on signal path 24 is directly proportional to accelerator pedal position. Those skilled in the art will, however, appreciate that other known accelerator pedal position sensors may be used to provide the accelerator pedal position signal to control computer 12, wherein examples of some such components include, but are not limited to, pressure sensors, magnetic or Hall effect sensors and the like.

System 10 further includes a key switch 26 connected to input IN2 of control computer 12 via signal path 28. Key switch 26 typically includes three switch positions; namely an "off" position, an "on" position and a "crank" position. In the on position, key switch provides an ignition signal TGN to control computer 12 on signal path 28 as is known in the art. The present invention further contemplates utilizing other known key switch systems operable to provide an IGN signal to control computer when the vehicle is running.

The engine 14 is preferably an internal combustion engine and includes an engine speed sensor 30 associated therewith which is electrically connected to input IN3 of control computer 12 via signal path 32. The engine speed sensor (ESS) 30 is operable to sense engine rotational speed (typically in RPMs) and/or engine position (typically in degrees relative to TDC), and provide an engine speed signal corresponding thereto on signal path 32. In one embodiment, engine speed sensor 30 is a Hall effect sensor responsive to passage thereby of a number of teeth of a gear or wheel rotating in synchronism with the engine 14 to provide the engine speed signal on signal path 32. Those skilled in the art will, however, appreciate that engine speed sensor 30 may alternatively be a variable reluctance or other known sensor operable to sense engine speed and/or position and provide a corresponding engine speed signal to control computer 12.

Control system 10 further includes a vehicle speed sensor (VSS) 34 electrically connected to an input IN4 of control computer 12 via signal path 36. Vehicle speed sensor 34 is operable to sense vehicle speed and provide a vehicle speed signal to control computer 12 corresponding thereto. In one embodiment, vehicle speed sensor 34 is a variable reluctance sensor positioned about a tailshaft 18 extending from transmission 16, although the present invention contemplates that the vehicle speed sensor 34 may be any known sensor positioned at a suitable vehicle location, wherein such a sensor is operable to provide control computer 12 with a signal indicative of vehicle speed.

System 10 further includes a vehicle cruise control unit 38 operable as is known in the art to provide control computer 12 with signals corresponding to desired road speed. Control computer 12 is, in turn, responsive to the signals provided by cruise control unit 38 to fuel the engine 14 accordingly. Cruise control unit 38 includes an ON/OFF switch 40 that is electrically connected to input IN5 of control computer 12 via signal path 42. Preferably, ON/OFF switch 40 is a known single pole single throw switch. Cruise control unit 38 also includes a multifunction switch 44 that is preferably a known center-off switch. Switch 44 has a SET/COAST position, electrically connected to input IN6 of control computer 12 via signal path 46a, and a RESUME/ACCEL position, electrically connected to input IN7 of control computer 12 via signal path 46b. Control computer 12 is responsive to an appropriate signal on signal path 46 to perform the known SET, COAST, RESUME and ACCEL operational modes associated with cruise control system 38 when the ON/OFF switch 40 is in the ON position. In accordance with operator actuation of ON/OFF switch 40 to the ON position, a corresponding signal is provided on signal path 42 to which control computer 12 is responsive to enable operation of cruise control system 38. Actuation of ON/OFF switch 38 from the OFF position to the ON position has no discernible affect on vehicle or engine operation, and only provides an appropriate signal on signal path 42 to which control computer 12 is responsive to enable processing of further cruise control signals provided on signal paths 46a and 46b, thereby allowing subsequent operation of cruise control system 26 as is known in the art. Actuation of the ON/OFF switch 42 from the ON position to the OFF position conversely provides a signal on signal path 42 to which control computer 12 is responsive to disable further operation of cruise control system 38. In accordance with the present invention, when ON/OFF switch 40 is in the OFF position, control computer 12 is preferably responsive to signals provided on signal paths 46a and 46b to control maximum road speed as will be described in greater detail hereinafter.

Control computer 12 includes a first output OUT1 electrically connected to a fuel system 56, associated with the engine 14, via signal path 58. Fuel system 56 may be any known fuel system including one or more fuel injectors, etc., and is responsive to fuel control signals provided thereto by control computer 12 to fuel the engine 14 accordingly.

System 10 further includes an auxiliary switch 48 connected to input IN8 of control computer 12 via signal path 50. In one embodiment, switch 48 is used to derate engine operation in response to changes in the vehicle configuration. It is to be understood, however, that auxiliary switch 48 may be any switch located within the cab area of the vehicle or external to the cab area.

Control computer 12 further includes an input/output port I/O1 for communicating with a service/recalibration tool 60 via signal path 62. Service/recalibration tool 60 is preferably a known service/recalibration tool operable to program or reprogram control computer 12, and to down load collected operational data therefrom, as is known in the art. As it relates to the present invention, service/recalibration tool 60 is typically used to program control computer 12 with calibration information such as maximum road speed, minimum road speed, road speed increase/decrease rate, etc. as will be described in greater detail hereinafter.

System 10 may further include several optional interface devices and systems for providing enhanced operation of the road speed control system 10 of the present invention. One example of such an optional interface device or system includes an interface module 64 connected to an input/output port I/O2 of control computer 12 via signal path 66. Module 64 preferably includes an auxiliary computer associated therewith that is operable to exchange information with control computer 12 via signal path 66, a keypad for entering control information and a display for viewing control information entered via the keypad as well as other engine/vehicle operational information. In one embodiment, interface module 64 is a configurable module such as that described in U.S. Pat. No. 5,303,163 to Ebaugh et al., which is assigned to the assignee of the present invention, the contents of which are incorporated herein by reference. It is to be understood, however, that any interface module meeting the above description may alternatively be used.

Another example of an optional device or system for providing enhanced operation of the road speed control system 10 of the present invention includes a known GPS receiver 52 connected to input IN9 of control computer 12 via signal path 54. GPS receiver is operable, as is known in the art, to receive signals broadcast by a plurality of earth orbiting satellites, from which latitudinal, longitudinal and altitudinal coordinates of the GPS receiver, as well as time and date of reception thereof, can be determined. In one embodiment, GPS receiver 52 includes a processor operable to determine such information and supply any or all of it to control computer 12 via signal path 54. Alternatively, GPS receiver 52 may be configured to provide the received signals to control computer 12, wherein control computer 12 is operable to process the signals to provide any or all of the position/date/time information just described.

Another example of an optional device or system for providing enhanced operation of the road speed control system 10 of the present invention includes a signal transceiver 68 connected to input/output port I/O3 of control computer 12 via signal path 70. In one embodiment, signal transceiver 68 includes a radio frequency receiver operable to receive locally or remotely transmitted radio communication signals. In another embodiment, signal transceiver 68 includes a cellular telephone transceiver operable to communicate with a remote cellular transceiver as is known in the art. In either case, transceiver 68 may include signal processing circuitry for decoding and processing such signals, and for providing the decoded information to control computer 12 via signal path 70, and in the case of a cellular transceiver, control computer 12 provides the desired information to transceiver 68 which is operable to encode the signals and transmit them to a remote receiver. Alternatively, transceiver 68 provides the received signals directly to control computer 12 for further processing, and in the case of a cellular transceiver, control computer 12 provides pre-processed signals to transceiver 68 for direct transmission to a remote receiver.

Yet another example of an optional device or system for providing enhanced operation of the road speed control system 10 of the present invention includes a proximity sensing system 72 connected to input/output port I/O4 of control computer 12 via signal path 74. In one embodiment, proximity sensing system 72 includes one or more proximity sensors operable to sense the presence of, or distance to, another object in front of, behind, or beside the vehicle carrying system 10, and provide corresponding signals to control computer 12 via signal path 74. In some cases, information relating to the distance between the vehicle carrying system 10 and another object is desirable so that control computer 12 may control maximum road speed in order to maintain the vehicle some particular distance behind or in front of another vehicle. Accordingly, proximity sensing system 72 preferably includes a known forward and/or rearward looking radar system operable to provide control computer 12 with the distance information. It is to be understood, however, that the present invention contemplates other known proximity systems operable to provide such distance information to control computer 12. In other cases, information relating to the distance between the vehicle carrying system 10 and another object is not critical, but rather whether any object is within some predefined distance from the vehicle, such as whether another vehicle is traveling alongside the vehicle carrying system 10. Accordingly, proximity sensing system 72 preferably includes one or more known proximity sensors operable to sense the presence of another object within some predefined distance therefrom, and provide corresponding proximity signals to control computer 12 on signal path 74. It is to be understood that the foregoing optional interface devices and/or systems are only examples of some devices/systems that may be used to interface with control computer 12 to thereby enhance the operation of the road speed control system of the present invention, as will be described in greater detail hereinafter. Those skilled in the art will recognize that other devices and/or systems may accordingly be combined with system 10 to further enhance the road speed control thereof without deviating from the scope of the present invention.

Figure 2:
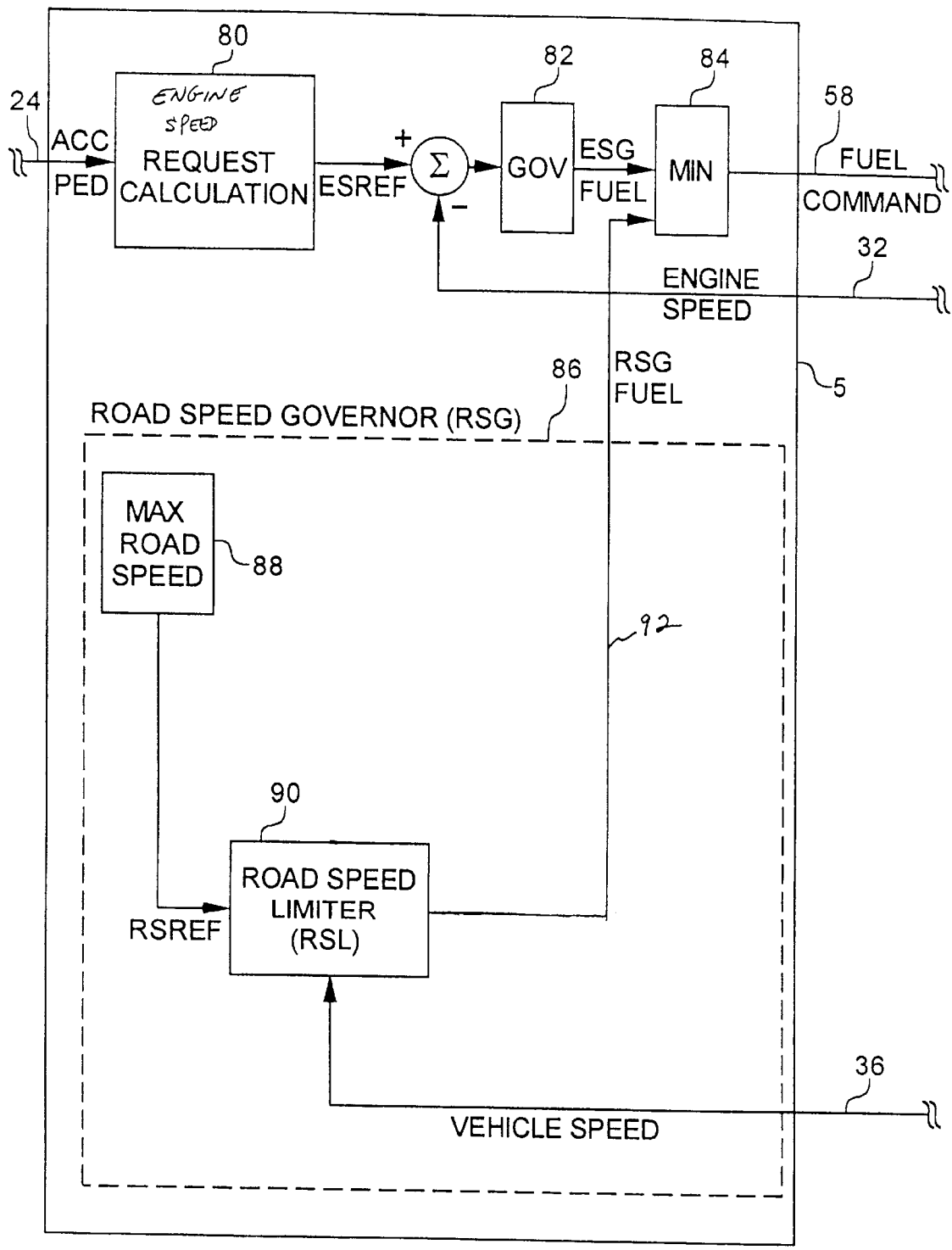
FIG. 2 is a block diagram illustration of some of the features of a prior art control computer of the type shown in FIG. 1, as they relate to the present invention.
Figure 3:
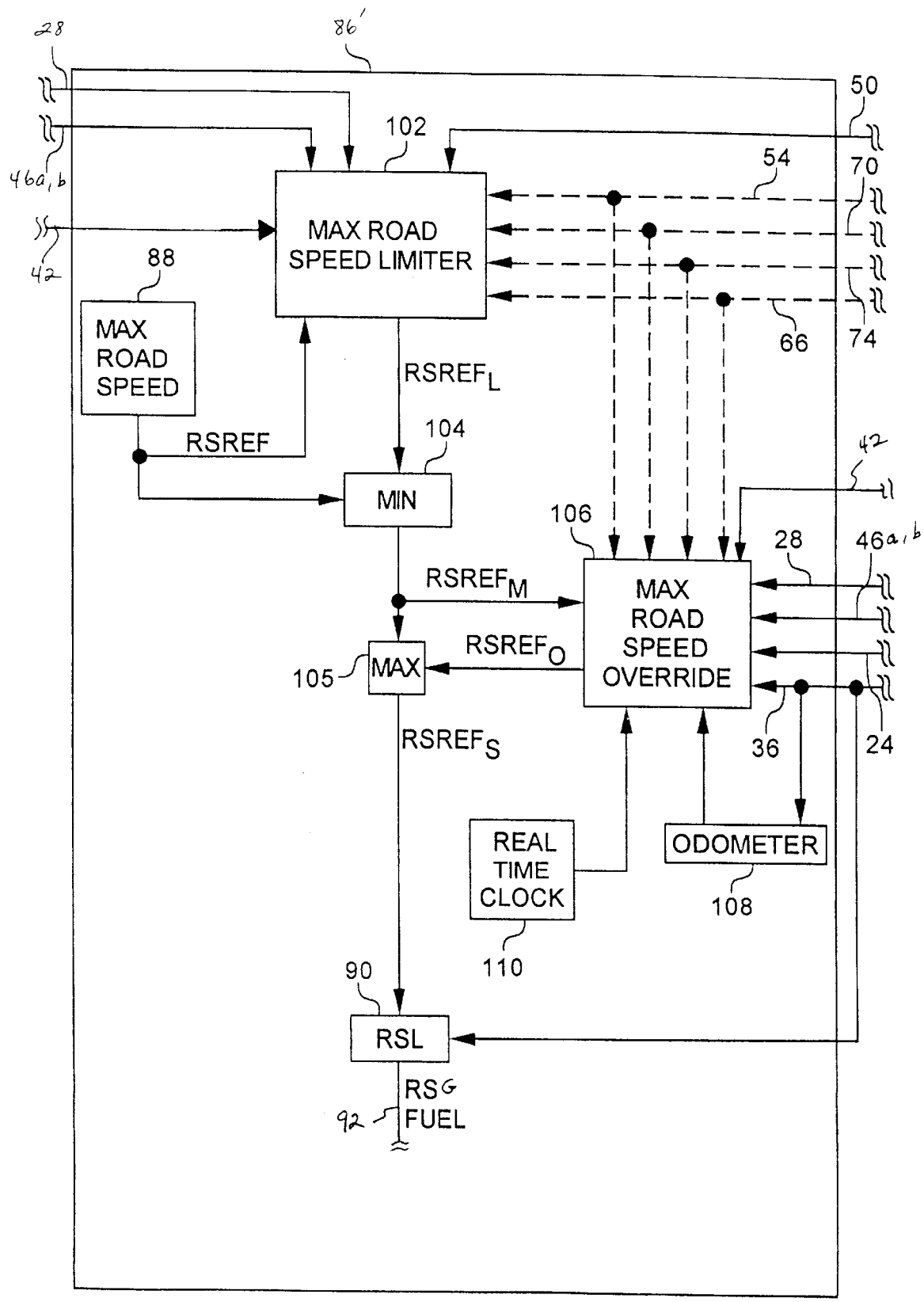
FIG. 3 is a block diagram illustration of some of the internal features of the control computer of FIG. 1 as they relate to road speed governing, in accordance with the present invention.

Referring now to FIG. 3, some of the internal features of one embodiment 86' of a road speed control system, in accordance with the present invention, are illustrated wherein system 86' is operable to replace road speed governor 86 of control computer 5 (FIG. 2) and is preferably included as part of control computer 12 of FIG. 3. Some of the internal features of road speed control system 86' are identical to those illustrated and described with respect to the road speed governor 86 of FIG. 2, and like numbers are accordingly used to identify like elements. Road speed control system 86' includes a max road speed block 88 producing a road speed reference value RSREF, wherein RSREF is supplied to a max road speed limiter 102, in accordance with one aspect of the present invention. Max road speed limiter block 102 further receives as inputs the key switch signal provided on signal path 28, the cruise control ON/OFF signal provided on signal path 42, the SET/COAST and RESUME/ACCEL signals provided on signal path 46a and 46b respectively, the auxiliary switch signal provided on signal path 50, the GPS signals on signal path 54, the interface module signals on signal path 66, the signal transceiver signals on signal path 70 and the proximity sensing system signals on signal path 74. The max road speed limiter block 102 is operable to process such signals and produce a limited road speed reference signal RSREFL in accordance therewith, wherein $RSREF_L$ is less than or equal to RSREF and is greater than a minimum road speed reference value $RSREF_{MIN}$. Details of the operation of the max road speed limiter 102 will be described hereinafter with respect to FIGS. 4A–4D. In any case, the road speed reference values RSREF and $RSREF_L$ are supplied to a MIN block 104 which provides as an output a road speed reference value $RSREF_M$ corresponding to the minimum value of the RSREF and $RSREF_L$ values. Preferably, if the max road speed limiter 102 is not active, system 86' is operable to set $RSREF_L$=RSREF so that $RSREF_M$=RSREF. On the other hand, if the max road speed limiter 102 is active and $RSREF_L$ is set to a maximum road speed value that is less than the programmed maximum road speed value RSREF, $RSREF_M$=$RSREF_L$, wherein $RSREF_M$ is less than RSREF. Alternatively, the MIN block 104 may be replaced by a summing node. In this case, if the max road speed limiter block 102 is not active, control system 86' is operable to set $RSREF_L$=0 so that $RSREF_M$=RSREF. If, on the other hand, the max road speed limiter block 102 is active, $RSREF_L$ is set to a road speed offset value that is subtracted from RSREF by the summing node. The result is identical to that achieved by the MIN block 104 in that the limited maximum road speed value $RSREF_L$ is equal to a maximum road speed value that is less than RSREF.

The $RSREF_M$ value is supplied to a MAX block 105 and to a max road speed override block 106. Max road speed override block 106 further receives as inputs the key switch signal provided on signal path 28, the cruise control ON/OFF signal provided on signal path 42, the SET/COAST and/or RESUME/ACCEL signals provided on signal paths 46a and 46b respectively, the accelerator pedal signal provided on signal path 24, the vehicle speed signal provided on signal path 36, the GPS signals on signal path 54, the interface module signals on signal path 66, the signal transceiver signals on signal path 70 and the proximity sensing system signals on signal path 74. The vehicle speed signal on signal path 36 is also supplied to a resettable odometer block 108 operable to accumulate trip miles as is known in the art. Preferably, odometer block 108 is resettable via the service/recalibration tool 60 as is known in the art. A real time clock 110 is also provided and supplies a real time clock signal to max road speed override block 106. The max road speed override block 106 is operable to process the foregoing signals, preferably in a manner to be described hereinafter with respect to FIGS. 5A–5C, and produce a road speed reference value $RSREF_O$ which is supplied to MAX block 105. The road speed reference values $RSREF_M$ and $RSREF_O$ are supplied to a MAX block 105 which provides as an output a system road speed reference value $RSREF_S$ corresponding to the maximum value of the $RSREF_M$ and $RSREF_O$ values. Preferably, if the max road speed override block 106 is not active, system 86' is operable to set $RSREF_O=RSREF_M$ so that $RSREF_S=RSREF_M$. On the other hand, if the max road speed override block 106 is active and $RSREF_O$ is set to a maximum road speed value that is greater than $RSREF_M$, then $RSREF_S=RSREF_O$, wherein $RSREF_O$ is greater than $RSREF_M$. Alternatively, the MAX block 105 may be replaced by a summing node. In this case, if the max road speed override block 106 is not active, system 86' is operable to set $RSREF_O=0$ so that $RSREF_S=RSREF_M$. If, on the other hand, the max road speed override block 106 is active, $RSREF_O$ is set to a road speed offset value that is added to $RSREF_M$ by the summing node. The result is identical to that achieved by the MAX block 105 in that the system maximum road speed value $RSREF_S$ is equal to a maximum road speed value that is greater than $RSREF_M$. In any case, the system max road speed value $RSREF_S$ is supplied to RSL 90 which is responsive to $RSREF_S$ and to the vehicle speed signal on signal path 36 to provide an RSG FUEL command value to MIN block 84 (FIG. 2) as described in the BACKGROUND section with respect to FIG. 2.

In accordance with one aspect of the present invention, the max road speed limiter block 102 of system 86' is responsive to one or more of the control signal inputs thereto to limit the programmed maximum road speed reference value RSREF to a lesser maximum road speed value $RSREF_L$. One embodiment of a software algorithm 150 for directing road speed limiter block 102 to provide a limited maximum road speed reference value $RSREF_L$, in accordance with the present invention, is illustrated in FIGS. 4A–4D. It is to be understood that although the various control signals described with respect to algorithm 150 are graphically illustrated in FIG. 3 as being provided to the max road speed limiter block 102, execution of algorithm 150 will be described hereafter as being generally executed by control computer 12, preferably many times per second. Moreover, algorithm 150, as shown in FIGS. 4A–4D, assumes that MIN block 104 is in place, although adapting algorithm 150 for replacement of block 104 with a summing node as described above would be a mere mechanical step for a skilled software programmer. In any event, execution of algorithm 150 begins at step 152 and at step 154, control computer 12 is operable to monitor signal path 28 and determine whether a new IGN signal is present. Preferably, control computer 12 is operable to determine that a new IGN signal is present if the key switch 26 has transistioned from the off position to the on position. If control computer 12 determines that a new IGN signal is present, algorithm execution continues at step 156 where the limited maximum road speed value $RSREF_L$ is reset to the programmed maximum road speed value RSREF. Thereafter, or if no new IGN signal was found to be present at step 154, algorithm execution continues at step 158.

At step 158, control computer 12 monitors the signal on signal path 42 to determine whether the cruise control unit 38 is enabled for operation. If the ON/OFF switch 40 is in the ON position, then the cruise control unit 38 is enabled for operation, and algorithm execution continues at step 164 where control computer 12 disables operation of the max road speed limiter block 102 by resetting $RSREF_L$ to RSREF. If, at step 158, control computer 12 determines that switch 40 is in the OFF position, algorithm execution continues at step 160. At step 160, control computer 12 determines whether the engine 14 is running, preferably by monitoring the engine speed signal provided on signal path 32 and making a determination that the engine 14 is running if the engine speed signal corresponds to an engine speed above some idling threshold RPM value. If, at step 160, control computer 12 determines that the engine is not running, algorithm execution continues at step 164 where $RSREF_L$ is reset to RSREF. If, however, control computer 12 determines at step 160 that the engine 14 is running, algorithm execution continues at step 162 where control computer 12 determines whether the fuel command signal (see FIG. 2) is above some fuel command threshold value. If not, algorithm execution continues at step 164 where $RSREF_L$ is reset to RSREF, and algorithm execution continues from step 164 at step 166 where execution of algorithm 150 is returned to its calling routine. Alternatively, step 164 may loop back to step 154 for continuous operation of algorithm 150. In any case, if control computer 12 determines at step 162 that the fuel command signal is above the threshold value, then the max road speed limiter block 102 is enabled for operation and algorithm execution continues at step 168.

Figure 4A:
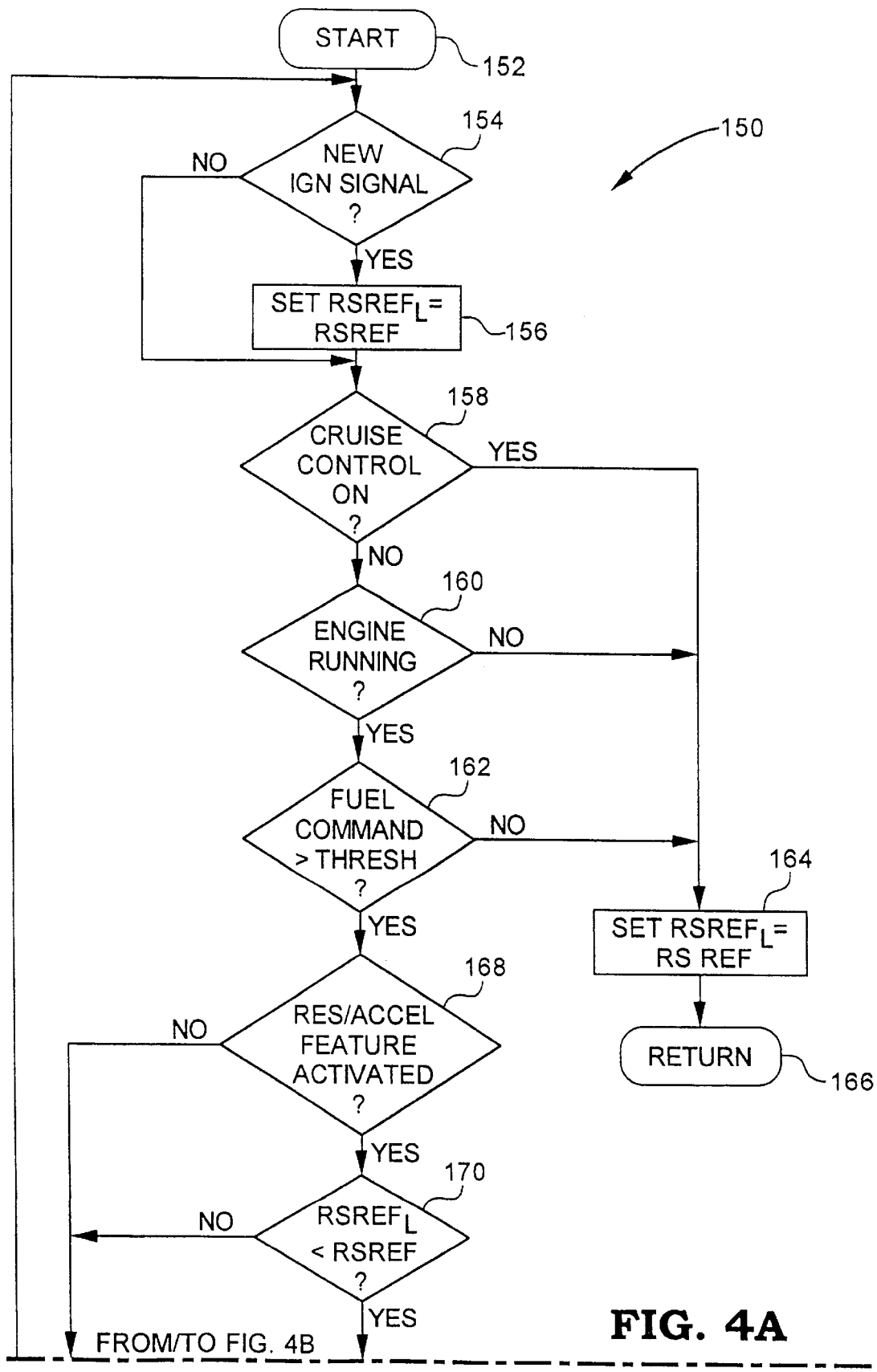
FIG. 4 is composed of FIGS. 4A–4D, and is a flowchart illustrating one preferred embodiment of a software algorithm, executable by the system of FIG. 1, for limiting the maximum allowable road speed, in accordance with one aspect of the present invention.
Figure 4B:
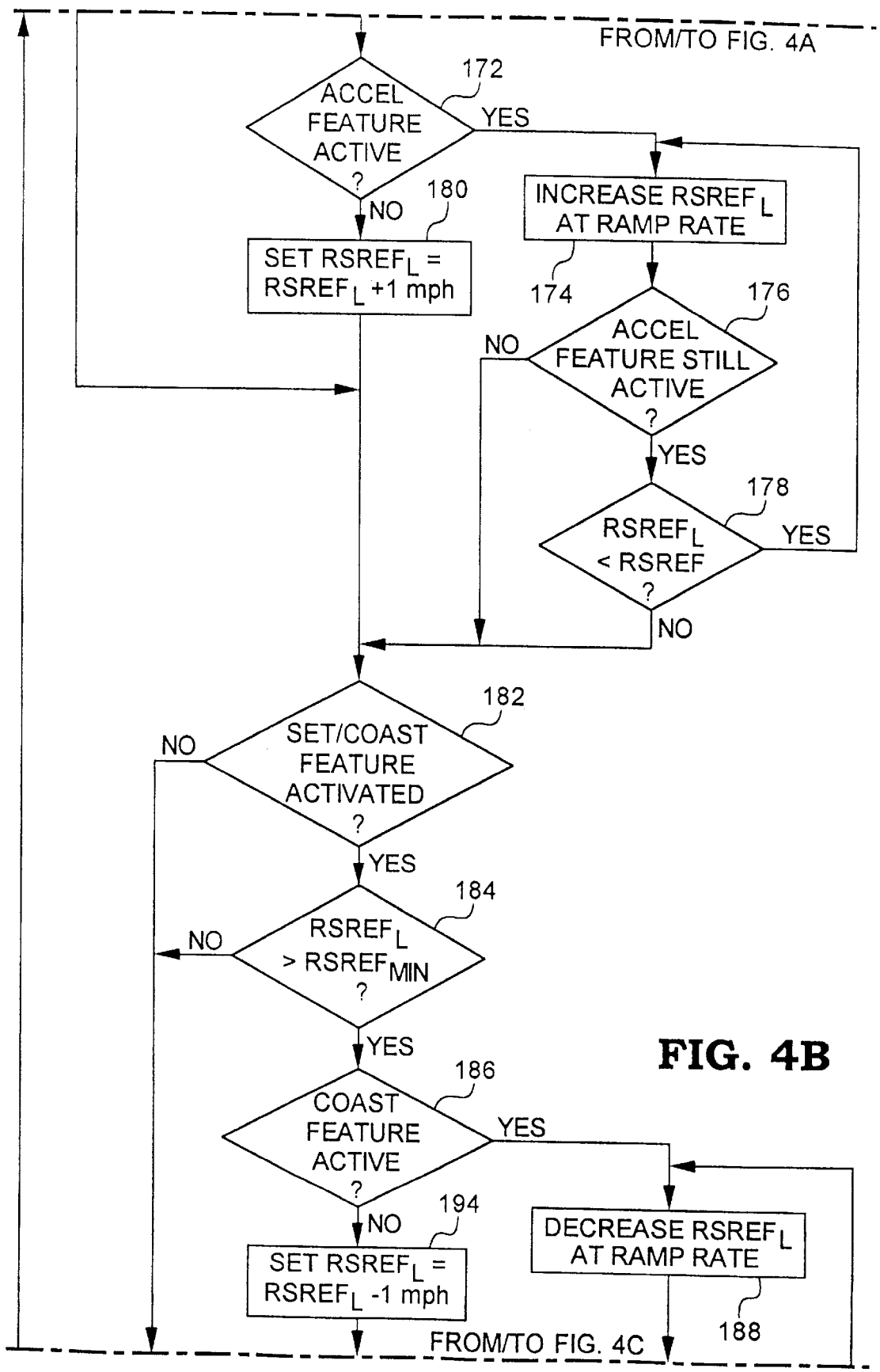
Figure 4D:
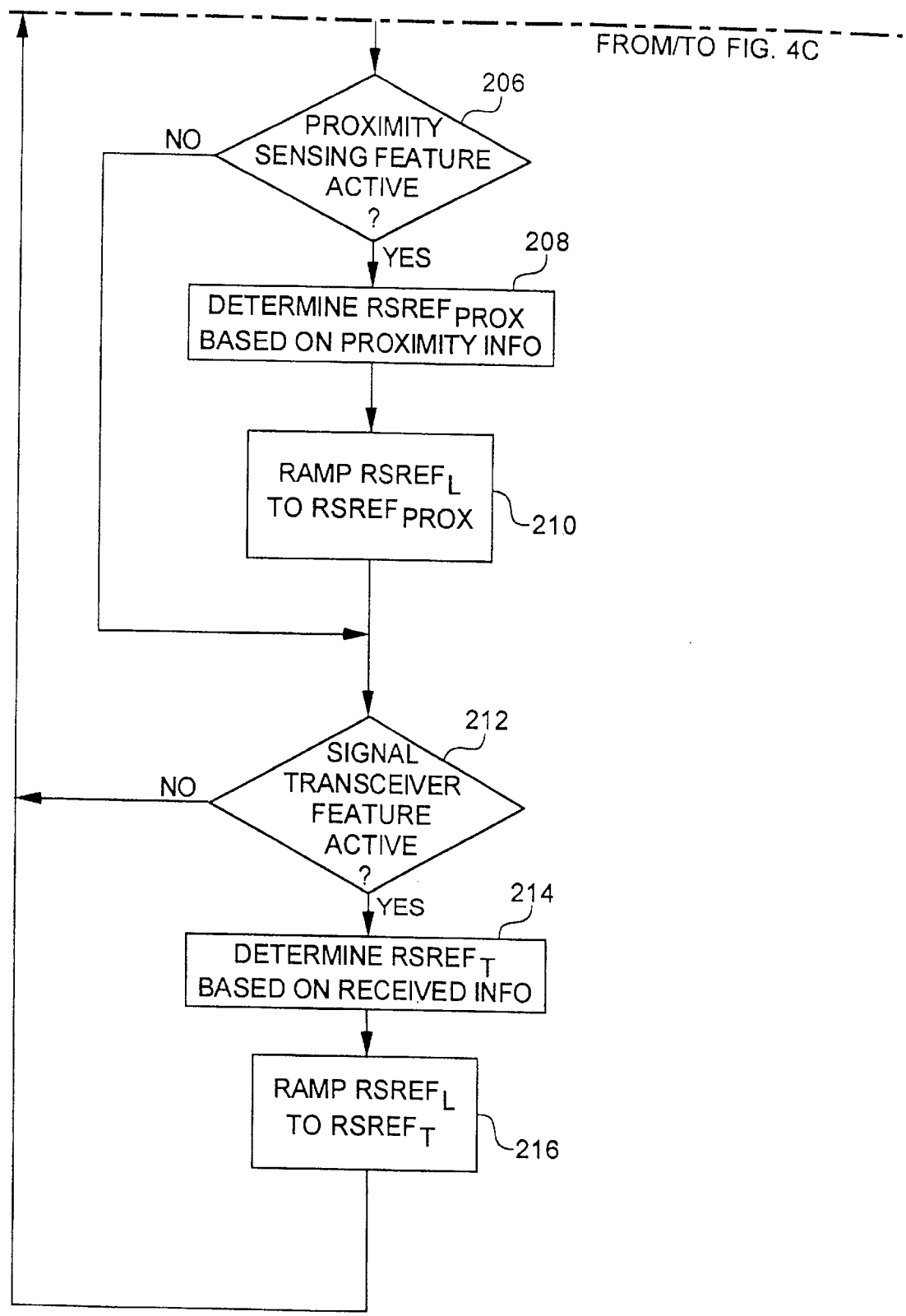

At step 168, control computer 12 determines whether the RES/ACCEL feature of switch 44 has been activated. If not, algorithm execution continues at step 182 (FIG. 4B). The RES/ACCEL feature of cruise control unit 38 is preferably used to increase the value of $RSREF_L$ as long as $RSREF_L$ is less than the programmed maximum road speed value RSREF. Thus, if control computer 12 determines at step 168 that the RES/ACCEL feature of switch 44 has been activated, algorithm execution continues at step 170 where control computer 12 is operable to compare $RSREF_L$ with RSREF. If, at step 170, $RSREF_L$ is less than RSREF, then the value of $RSREF_L$ may be increased (but preferably not to exceed RSREF) and algorithm execution continues at step 172. If, on the other hand, control computer 12 determines at step 170 that $RSREF_L$ is not less than RSREF, then $RSREF_L$ may not be increased and algorithm execution continues at step 182. At step 172, control computer 12 is operable to determine whether the ACCEL or RES feature of switch 44 has been activated. If the RES feature has been activated, preferably by determining that switch 44 has been only momentarily depressed to the RES/ACCEL position, algorithm execution continues at step 180 where the $RSREF_L$ is incrementally increased. In one embodiment, momentary depression of switch 44 to the RES/ACCEL position results in a one mile per hour (mph) increase in the value of $RSREF_L$, although the present invention contemplates that $RSREF_L$ may be increased by any desired mph increase at step 180. In any case, algorithm execution continues from step 180 at step 182.

If, at step 172, control computer 12 determines that the ACCEL feature has been activated, preferably by determining that switch 44 has been depressed to the RES/ACCEL position and held in that position for some time period, algorithm execution continues at step 174 where control computer 12 is operable to increase $RSREF_L$ at a predefined ramp rate. Preferably, the predefined ramp rate is a non-programmable parameter set by the engine manufacturer, although the present invention contemplates that this parameter may alternatively be adjustable via the service/recalibration tool 60. In any case, algorithm execution continues from step 174 at step 176 where control computer 12 is operable to monitor the signal on signal path 46b to determine whether the ACCEL feature is still active, i.e. whether switch 44 is still being held in the RES/ACCEL position. If not, algorithm execution continues at step 182. If, on the other hand, control computer 12 determines at step 176 that the ACCEL feature is still active, algorithm execution continues at step 178 where control computer 12 is operable to compare $RSREF_L$ with RSREF. If, at step 178, $RSREF_L$ is still less than RSREF, algorithm execution loops back to step 174 where the increase of $RSREF_L$ is continued at the predefined ramp rate. If, at step 178, $RSREF_L$ is not less than RSREF, no further increase in $RSREF_L$ is permitted and algorithm execution continues at step 182.

At step 182, control computer 12 determines whether the SET/COAST feature of switch 44 has been activated. If not, algorithm execution continues at step 196 (FIG. 4C). In accordance with the embodiment of system 10 illustrated in FIGS. 1 and 3, the SET/COAST feature of cruise control unit 38 is preferably used to decrease the value of $RSREF_L$ as long as $RSREF_L$ is less than a programmed minimum road speed value $RSREF_{MIN}$. Thus, if control computer 12 determines at step 182 that the SET/COAST feature of switch 44 has been activated, algorithm execution continues at step 184 where control computer 12 is operable to compare $RSREF_L$ with $RSREF_{MIN}$. If, at step 184, $RSREF_L$ is less than $RSREF_{MIN}$, then the value of $RSREF_L$ may be decreased (but preferably not below $RSREF_{MIN}$) and algorithm execution continues at step 186. If, on the other hand, control computer 12 determines at step 184 that $RSREF_L$ is not less than $RSREF_{MIN}$, then $RSREF_L$ may not be decreased and algorithm execution continues at step 196. At step 186, control computer 12 is operable to determine whether the SET or COAST feature of switch 44 has been activated. If the SET feature has been activated, preferably by determining that switch 44 has been only momentarily depressed to the SET/COAST position, algorithm execution continues at step 194 where the $RSREF_L$ is incrementally decreased. In one embodiment, momentary depression of switch 44 to the SET/COAST position results in a one mile per hour (mph) decrease in the value of $RSREF_L$, although the present invention contemplates that $RSREF_L$ may be decreased by any desired mph decrease, and/or based on other operating parameters, at step 194. For example, control computer 12 may be operable at step 194 to first monitor the current vehicle speed on signal path 36 and, if the current vehicle speed is much less than the current value of $RSREF_L$, to set $RSREF_L$=current vehicle speed (but not less than $RSREF_{MIN}$). Subsequent activation of the SET feature then results in an incremental decrease in the newly established $RSREF_L$ value. This feature thus prevents having to "ramp down" $RSREF_L$ when vehicle speed is much less than $RSREF_L$. In any case, algorithm execution continues from step 194 at step 196.

If, at step 186, control computer 12 determines that the COAST feature has been activated, preferably by determining that switch 44 has been depressed to the SET/COAST position and held in that position for some time period, algorithm execution continues at step 188 where control computer 12 is operable to decrease $RSREF_L$ at a predefined ramp rate. Preferably, the predefined ramp rate is a non-programmable parameter set by the engine manufacturer, although the present invention contemplates that this parameter may alternatively be adjustable via the service/recalibration tool 60. In any case, algorithm execution continues from step 188 at step 190 where control computer 12 is operable to monitor the signal on signal path 46a to determine whether the COAST feature is still active, i.e. whether switch 44 is still being held in the SET/COAST position. If not, algorithm execution continues at step 196. If, on the other hand, control computer 12 determines at step 190 that the COAST feature is still active, algorithm execution continues at step 192 where control computer 12 is operable to compare $RSREF_L$ with $RSREF_{MIN}$. If, at step 192, $RSREF_L$ is still greater than $RSREF_{MIN}$, algorithm execution loops back to step 188 where the decrease of $RSREF_L$ is continued at the predefined ramp rate. If, at step 192, $RSREF_L$ is not greater than $RSREF_{MIN}$, no further decrease in $RSREF_L$ is permitted and algorithm execution continues at step 196.

Although steps 168–194 have been described as controlling the increase/decrease in $RSREF_L$ via the multifunction switch 44 of cruise control unit 38, it is to be understood that any switch or combination of switches may be used in place thereof, and any adaptation of software algorithm 150 necessary to accommodate such an alternate switch or combination of switches would be a mechanical step for a skilled software programmer. One example of such an alternate switch or combination of switches may be provided by interface module 64, which is preferably a dash-mounted control/display unit. The above described functions of switch 44 may be replaced by predefined keystrokes of a keypad provided with module 64, or by a touch screen switch or switches. In either case, module 64 preferably displays the current maximum road speed value to the driver.

At step 196, control computer 12 monitors the signal on signal path 48 to determine whether auxiliary switch 48 has been activated. If so, algorithm execution continues at step 198 where control computer 12 sets $RSREF_L$ to a calibratable maximum road speed value $RSREF_{CAL}$. Preferably, $RSREF_{CAL}$ is adjustable via the service/recalibration tool 60, wherein the value of $RSREF_{CAL}$ is set at some road speed value between $RSREF_{MIN}$ and RSREF. If, at step 196, control computer 12 determines that switch 48 is not active, or after execution of step 198, algorithm execution continues at step 200.

At step 200, control computer 12 determines whether the GPS feature is available and active. If a GPS receiver 52 is provided, control computer 12 preferably executes step 200 by monitoring signal path 54 for incoming GPS signals. If no such GPS signals are available, algorithm execution continues at step 206. If, on the other hand, control computer 12 determines at step 200 that GPS signals are available, algorithm execution continues at step 202 where control computer 12 is operable to determine a maximum road speed value based on the received GPS coordinates. In accordance with the present invention, the maximum road speed value may be adjusted (either increased or decreased within the road speed range defined by RSREF and $RSREF_{MIN}$) in accordance with vehicle location as determined by the received GPS coordinates. This feature may be useful, for example, in forcing compliance with state or local speed laws, controlling emissions and/or maximizing fuel economy. Other uses of this feature will become apparent to those skilled in the art, it being understood that such uses are intended to fall within the scope of the present invention. In one embodiment, control computer 12 preferably includes one or more tables or maps of $RSREF_{GPS}$ values as a function of GPS coordinates or GPS coordinate boundaries.

Control computer 12 is accordingly operable at step 202 to map current GPS coordinates to a desired $RSREF_{GPS}$ value. In an alternate embodiment, control computer 12 may be operable to periodically transmit current GPS position information to a remote computer which then transmits corresponding $RSREF_{GPS}$ tables or maps to control computer 12 via signal transceiver 68. In yet another embodiment, control computer 12 may be operable to continuously transmit current GPS position information to a remote computer which then transmits corresponding $RSREF_{GPS}$ values to control computer 12 for immediate use. In any case, algorithm execution continues from step 202 at step 204 where control computer 12 is preferably operable to ramp $RSREF_L$ to the $RSREF_{GPS}$ value, wherein $RSREF_{MIN}<RSREF_{GPS}<RSREF$. Algorithm execution continues from step 204 at step 206.

At step 206, control computer 12 determines whether the proximity sensing feature is available and active. If a proximity sensing system 72 is provided, control computer 12 preferably executes step 206 by monitoring signal path 74 for incoming proximity signals. If no such proximity signals are available, algorithm execution continues at step 210. If, on the other hand, control computer 12 determines at step 206 that proximity signals are available, algorithm execution continues at step 208 where control computer 12 is operable to determine a maximum road speed value based on the received proximity signals. In accordance with the present invention, the maximum road speed value may be adjusted (either increased or decreased within the road speed range defined by RSREF and $RSREF_{MIN}$) in accordance with vehicle proximity relative to a preceding or trailing vehicle. This feature may be useful, for example, in automatically maintaining a predefined distance behind a preceding vehicle, or in front of a trailing vehicle, as long as the accelerator pedal is fully depressed, to thereby provide a convoy feature under manual engine fueling conditions. In one embodiment, control computer 12 is preferably operable to monitor the signals on signal path 74, continuously calculate road speed necessary to maintain the predefined distance, and set a maximum road speed value $RSREF_{PROX}$ to the calculated road speed. Algorithm execution continues from step 208 at step 210 where control computer 12 is preferably operable to ramp $RSREF_L$ to the $RSREF_{PROX}$ value, wherein $RSREF_{MIN}<RSREF_{PROX}<RSREF$. Algorithm execution continues from step 210 at step 212.

At step 212, control computer 12 determines whether the signal transceiver feature is available and active. If a signal transceiver 68 is provided, control computer 12 preferably executes step 212 by monitoring signal path 70 for incoming communication signals. If no such communication signals are available, algorithm execution loops back up to step 154 (FIG. 4A). If, on the other hand, control computer 12 determines at step 212 that communication signals are available, algorithm execution continues at step 214 where control computer 12 is operable to determine a maximum road speed value based on the received communication signals. In accordance with the present invention, the maximum road speed value may be adjusted (either increased or decreased within the road speed range defined by RSREF and $RSREF_{MIN}$) in accordance with information received by signal transceiver 68. This feature may be useful, for example, in forcing compliance with state or local speed laws that may be broadcast by a remote facility, such as a radio broadcast station, and received by signal transceiver 72. In one embodiment, control computer 12 is preferably operable to monitor the signals on signal path 70, continuously calculate a corresponding road speed, and set a maximum road speed value $RSREF_T$ to the calculated road speed. Algorithm execution continues from step 214 at step 216 where control computer 12 is preferably operable to ramp $RSREF_L$ to the $RSREF_T$ value, wherein $RSREF_{MIN}<RSREF_T<RSREF$. Algorithm execution loops from step 216 back to step 154.

Algorithm 150 illustrated in FIGS. 4A–4D assumes that the manual road speed limiting mode (i.e. RES/ACCEL and SET/COAST features of steps 168–194), the auxiliary switch mode (steps 196–198), the GPS mode (steps 200–204), the proximity sensing mode (steps 206–210) and the signal transceiver mode (steps 212–216) are not simultaneously active, and the limited maximum road speed value $RSREF_L$ is accordingly set as described. The present invention contemplates, however, that each of these modes may alternatively be simultaneously active, in which case algorithm 150 should be modified accordingly. One preferred technique for doing so requires setting the limited maximum road speed value to a minimum of the maximum road speed values resulting from each of the foregoing operational modes. Those skilled in the art will recognize that other known software techniques may be used to achieve the same result. In any case, modification of algorithm 150 to achieve such results would be a mere mechanical step for a skilled software programmer.

Figure 5A:
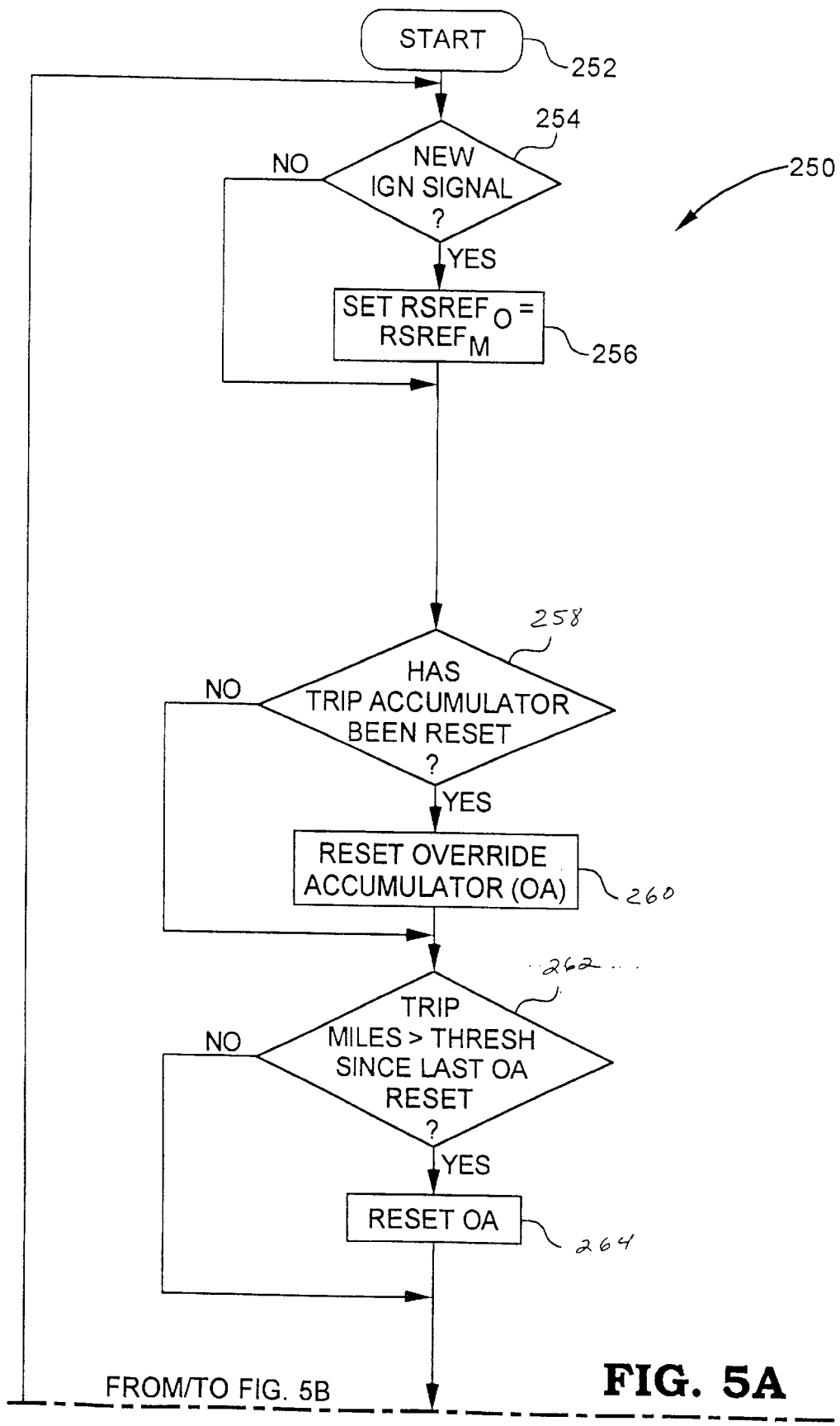
FIG. 5 is composed of FIGS. 5A–5C, and is a flowchart illustrating one preferred embodiment of a software algorithm, executable by the system of FIG. 1, for temporarily increasing the maximum allowable road speed, in accordance with another aspect of the present invention.
Figure 5B:
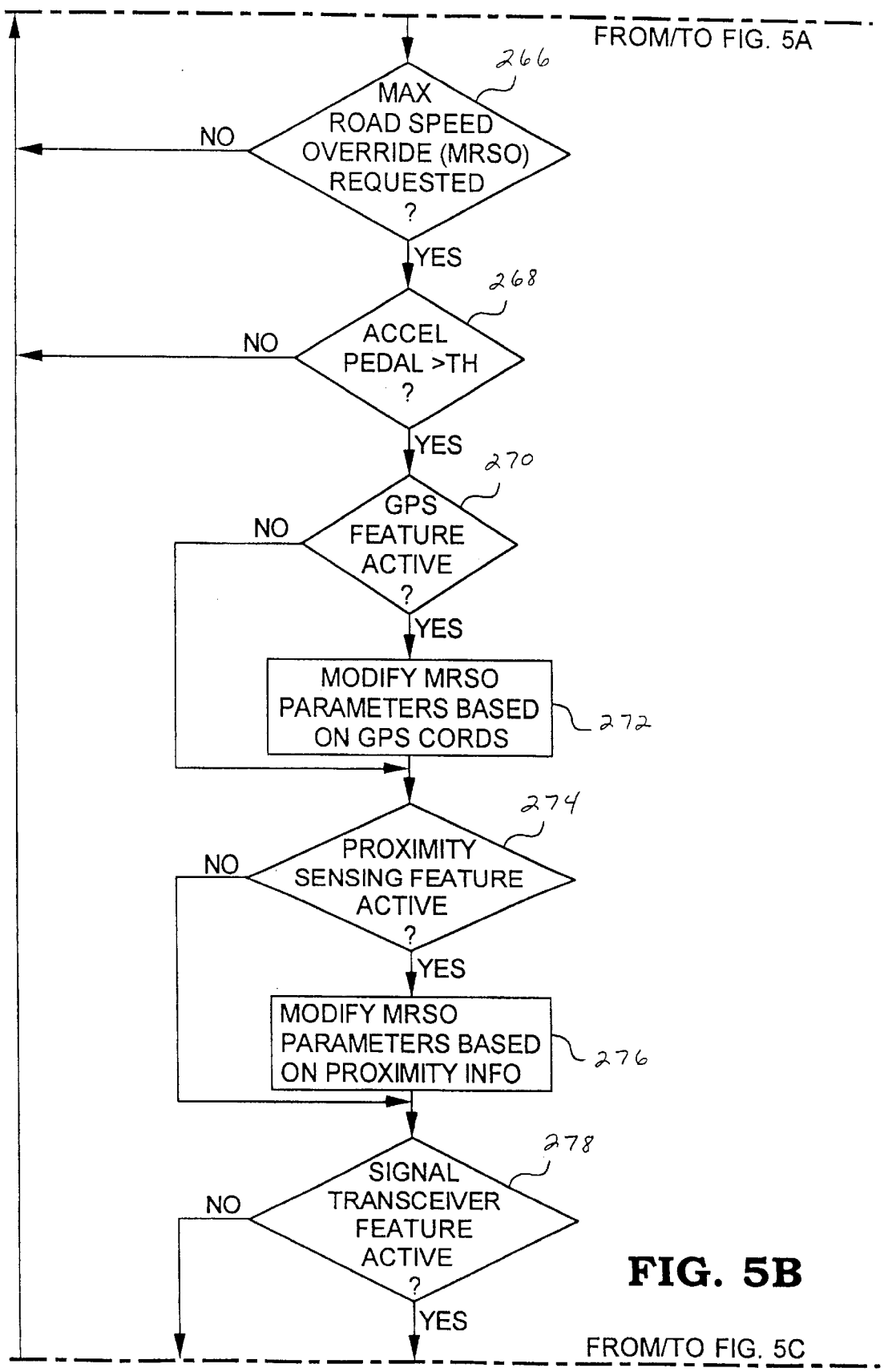
Figure 5C:
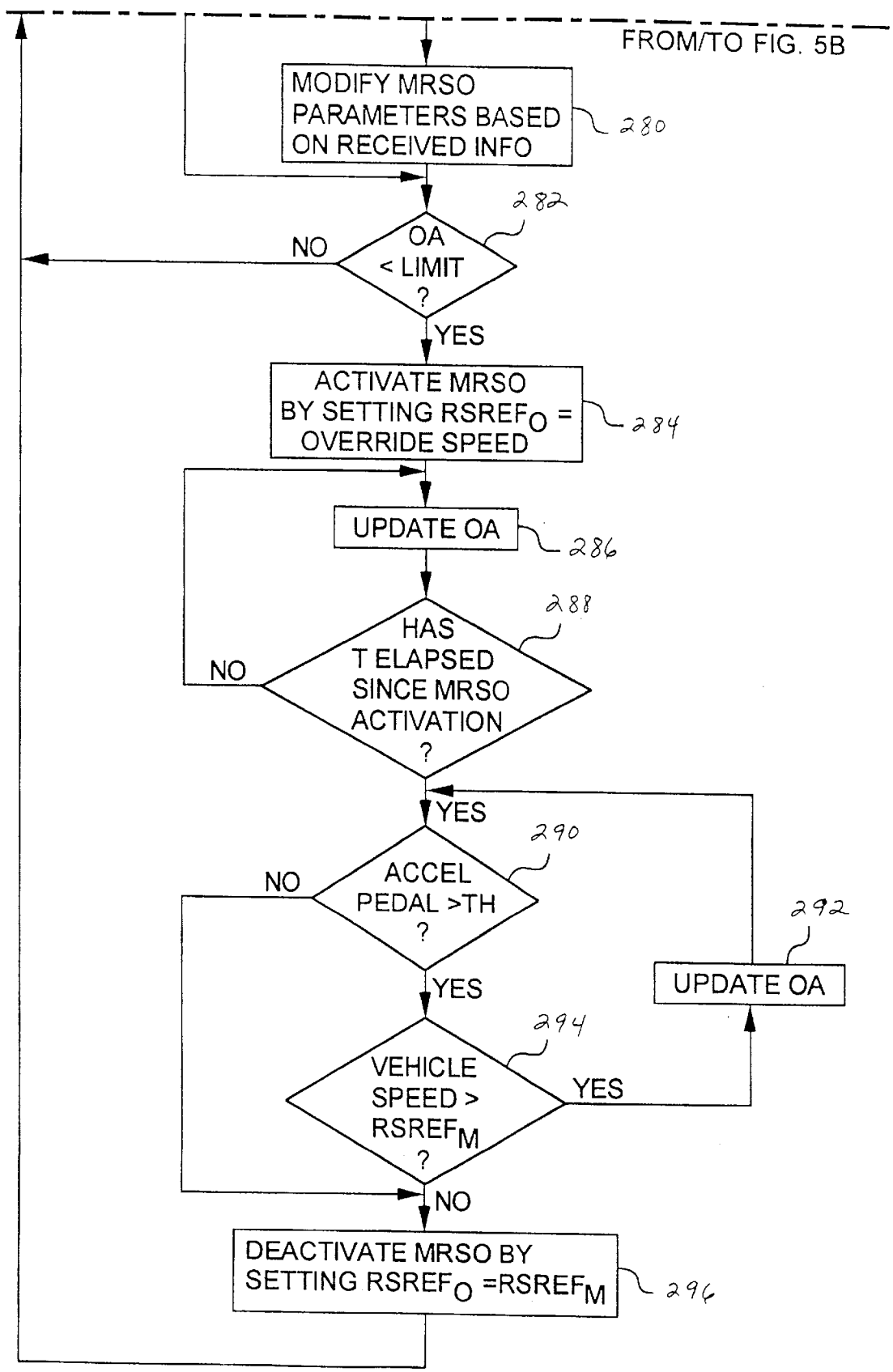

In accordance with another aspect of the present invention, the max road speed override block 106 of road speed control system 86' is responsive to one or more of the control signal inputs thereto to temporarily override or increase the maximum road speed reference value $RSREF_M$ to a greater maximum road speed value $RSREF_O$. One embodiment of a software algorithm 250 for directing road speed override block 106 to provide an increased maximum road speed reference value $RSREF_O$, in accordance with the present invention, is illustrated in FIGS. 5A–5C. It is to be understood that although the various control signals described with respect to algorithm 250 are graphically illustrated in FIG. 3 as being provided to the max road speed override block 106, execution of algorithm 250 will be described hereafter as being generally executed by control computer 12, preferably many times per second. Moreover, algorithm 250, as shown in FIGS. 5A–5C, assumes that MAX block 105 is in place, although adapting algorithm 250 for replacement of block 105 with a summing node as described above would be a mere mechanical step for a skilled software programmer. Furthermore, it is to be understood that the present invention contemplates enabling the max road speed override block 106 under manual fueling operation (i.e. under control of the accelerator pedal 20) and/or when the cruise control unit 38 is active by monitoring the accelerator pedal signal on signal path 24 and enabling block 106 if the vehicle operator overrides the cruise control unit 38 via the accelerator pedal as is known in the art.

Execution of algorithm 250 begins at step 252 and at step 254, control computer 12 is operable to monitor signal path 28 and determine whether a new IGN signal is present. Preferably, control computer 12 is operable to determine that a new IGN signal is present if the key switch 26 has transistioned from the off position to the on position. If control computer 12 determines that a new IGN signal is present, algorithm execution continues at step 256 where the override maximum road speed value $RSREF_O$ is reset to the input maximum road speed value $RSREF_M$. Thereafter, or if no new IGN signal was found to be present at step 254, algorithm execution continues at step 258.

At step 258, control computer 12 is operable to determine whether a trip accumulator has been reset. In one embodiment, max road speed override block 106 includes a first memory location or register therein that is responsive to the odometer signal provided by odometer 108 to accumulate trip mileage, although the present invention contemplates providing such an accumulator remote from control computer 12, but wherein the contents of the trip accumulator are accessible by control computer 12. The trip accumulator is preferably resettable via the service/recalibration tool 60 to some default value, preferably zero. Preferably, the contents of the trip accumulator are saved within a memory location of control computer 12 whenever the key switch 26 transitions to the OFF position. In any case, control computer 12 is operable at step 258 to monitor the contents of the trip accumulator and determine whether the trip accumulator has been reset. If not, algorithm execution continues at step 262. If, at step 258, control computer 12 determines that the trip accumulator has been reset, control computer 12 is operable at step 260 to reset an override accumulator (OA). In one embodiment, max road speed override block 106 includes a second memory location or register therein that is responsive to the odometer signal provided by odometer 108 to accumulate vehicle mileage while the max road speed override block 106 is active, although the present invention contemplates providing such an accumulator remote from control computer 12, but wherein the contents of the override accumulator are accessible by control computer 12. Control computer 12 is accordingly operable to track usage of the max road speed override feature in this embodiment by accumulating traveled mileage while block 106 is active. Details regarding the activation of block 106 will be described in greater detail hereinafter. In another embodiment, max road speed override block 106 includes a third memory location or register therein that is responsive to the real time clock signal provided by real time clock 110 to accumulate time while the max road speed override block 106 is active, although the present invention contemplates providing such an accumulator remote from control computer 12, but wherein the contents of the override accumulator are accessible by control computer 12. Control computer 12 is accordingly operable to track usage of the max road speed override feature in this embodiment by accumulating a total time that block 106 is active. In either case, the override accumulator is preferably resettable to a default value, such as zero, via the service/recalibration tool 60 and via control computer 12 pursuant to a software instruction. Algorithm execution continues from step 260 at step 262.

At step 262, control computer 12 is operable to determine whether the number of miles in the trip accumulator has exceeded a threshold value THRESH since the override accumulator was last reset. If not, algorithm execution continues at step 266. If, at step 262, control computer 12 determines that the trip accumulator has exceeded the threshold value THRESH since the override accumulator was last reset, control computer 12 is operable at step 264 to reset the override accumulator to a default value, preferably zero. Algorithm execution continues from step 264 at step 266.

At step 266, control computer 12 is operable to determine whether activation of the max road speed override feature has been requested by the driver. In one embodiment, control computer 12 preferably executes step 266 by monitoring the signals provided by switch 44 on signal path 46*a* and/or signal path 46*b*. If a predefined number, preferably three, of activations of switch 44 to the RES/ACCEL position (or alternatively to the SET/COAST position) are detected within a predetermined time period, control computer 12 is operable to interpret such a sequence as a request for max road speed override activation and algorithm execution continues at step 268. Conversely, if the above sequence is not detected, algorithm execution loops back to step 254. While the foregoing sequence of switch 44 activations are, in one embodiment, required for a valid request for activation of the max road speed override block 106, the present invention contemplates that control computer 12 may be configured to interpret any sequence or single activation of any auxiliary switch, or to interpret any of a number of signals provided thereto from an external device or system via a suitable data link (e.g. SAE J1587 or SAE J1939), as a valid request for the max road speed override feature. As one example, interface module 64 may be used to request activation of the feature wherein a single key, either on the keypad or embodied as a touch screen key, or a sequence of keys may be used to enter a valid feature activation request. In either case, the interface module 64 is preferably operable to display at least the operational status of the max road speed override feature as well as the status of the override accumulator.

At step 268, control computer 12 is operable to monitor the accelerator pedal signal on signal path 24 and compare this signal with a threshold value TH. If the accelerator pedal signal is below TH, the max road speed override feature is not activated and algorithm execution loops back to step 254. If, on the other hand, the accelerator pedal signal on signal path 24 is greater than the threshold value TH at step 268, algorithm execution continues at step 270.

At step 270, control computer 12 determines whether the GPS feature is available and active. If a GPS receiver 52 is provided, control computer 12 preferably executes step 270 by monitoring signal path 54 for incoming GPS signals. If no such GPS signals are available, algorithm execution continues at step 274. If, on the other hand, control computer 12 determines at step 270 that GPS signals are available, algorithm execution continues at step 272 where control computer 12 is operable to modify operating parameters of the max road speed override block 106 based on the received GPS coordinates. In accordance with the present invention, the override accumulator contents, the override accumulator limit, the trip accumulator threshold and/or maximum road speed value may be adjusted in accordance with vehicle location as determined by the received GPS coordinates. For example, in hilly terrains, the maximum road speed value $RSREF_O$ may be increased to a greater value to further facilitate passing attempts. As another example, the current override accumulator contents may be adjusted (between a reset value and some value in excess of an override accumulator limit) to thereby control the availability of max road speed override activation depending upon geographic location. In rural locations, the accumulator limit may be made larger to thereby extend availability of the override feature and in urban locations made smaller to thereby shorten the availability of the override feature. Within city limits, the max road speed override block 106 may be disabled entirely simply by setting the accumulator limit to zero. Similar results can be obtained by adjusting the value of the trip accumulator threshold. Other uses of this feature will become apparent to those skilled in the art, it being understood that such uses are intended to fall within the scope of the present invention.

At step 274, control computer 12 determines whether the proximity sensing feature is available and active. If a proximity sensing system 72 is provided, control computer 12 preferably executes step 274 by monitoring signal path 74 for incoming proximity signals. If no such proximity signals are available, algorithm execution continues at step 278. If, on the other hand, control computer 12 determines at step 274 that proximity signals are available, algorithm execution continues at step 276 where control computer 12 is operable to modify one or more operating parameters of max road speed override block 106 based on the received proximity signals. In accordance with the present invention, the override accumulator contents, the override accumulator limit, the trip accumulator threshold and/or maximum road speed value may be adjusted in accordance with vehicle location in accordance with vehicle proximity relative to another vehicle passing along the vehicle containing system 10. This feature may be useful, for example, in automatically disallowing activation of the max road speed override feature of the present invention whenever another vehicle is traveling alongside the vehicle containing system 10, wherein such a vehicle prohibits or delays any passing attempts. Other uses of this feature will become apparent to those skilled in the art, it being understood that such uses are intended to fall within the scope of the present invention.

At step 278, control computer 12 determines whether the signal transceiver feature is available and active. If a signal transceiver 68 is provided, control computer 12 preferably executes step 278 by monitoring signal path 70 for incoming communication signals. If no such communication signals are available, algorithm execution continues at step 280. If, on the other hand, control computer 12 determines at step 278 that communication signals are available, algorithm execution continues at step 282 where control computer 12 is operable to modify one or more operating parameters of max road speed override block 106 based on the received communication signals. This feature may be useful for at least some of the purposes provided above, and other uses of this feature will become apparent to those skilled in the art, it being understood that such uses are intended to fall within the scope of the present invention.

In accordance with the present invention, control computer 12 is operable to temporarily permit driver activation of the max road speed override block 106 for a predefined number of miles or a predefined time period for every trip leg, wherein a trip leg is defined as THRESH number of trip miles(step 262). Preferably, the driver is given the freedom to choose when to activate block 106 within any trip leg, with the understanding that if the max road speed override feature allotment within any trip leg (as defined by the contents of the override accumulator) is used up before reaching the end of the leg, the feature will not be available until the next leg because control computer 12 will not reset the override accumulator until the number of accumulated trip miles has exceeded THRESH since the most recent override accumulator reset (steps 262 and 264). Likewise, if a driver requests max road speed override operation and the override accumulator value exceeds the limit value, control computer 12 is operable to ignore the request. Thus, at step 282, control computer 12 is operable to compare the contents of the override accumulator with the override accumulator limit. If the override accumulator value exceeds the limit value, algorithm execution loops back to step 254 and the max road speed override request is denied. If, on the other hand, the override accumulator value is less than the limit value, algorithm execution continues at step 284 where control computer 12 is operable to activate the max road speed override feature by setting $RSREF_O$ to a programmed override speed value. Preferably, the override speed value is programmable via the service/recalibration tool 60, although the present invention contemplates conditions wherein control computer 12 may be operable to modify the value of the override speed value from its programmed value.

Algorithm execution continues from step 284 at step 286 where control computer 12 is operable to update the override accumulator contents, preferably based on either trip mileage or time as described above. Thereafter at step 288, control computer 12 is operable to determine whether a predetermined time period T has elapsed since the activation of the max road speed override feature at step 282. If not, algorithm execution loops back to step 286. If the time period T has elapsed at step 288, algorithm execution continues at step 290. Steps 286 and 288 are included to provide for a minimum activation time of the max road speed override block 106 to thereby prevent an immediate return of $RSREF_O$ back to $RSREF_M$ if any of the required conditions are no longer met.

At step 290, control computer 12 again monitors the accelerator pedal signal on signal path 24 and compares this signal with the threshold value TH. If the accelerator pedal signal is less than TH, algorithm execution continues at step 296. If, however, the accelerator pedal signal is greater than TH at step 290, algorithm execution continues at step 294 where control computer 12 is operable to compare the vehicle speed signal on signal path 36 with the max road speed value $RSREF_M$. If the vehicle speed is greater than $RSREF_M$ at step 294, algorithm execution continues at step 292 where control computer 12 is operable to update the override accumulator prior to looping back to step 290. If vehicle speed signal is below $RSREF_M$ at step 294, algorithm execution continues at step 296. Thus, control computer 12 is operable to maintain $RSREF_O$ at the override speed value as long as the accelerator pedal is depressed beyond a threshold position and vehicle speed is above the input max road speed value $RSREF_M$. At step 296, control computer 12 is operable to deactivate the max road speed override block 106 by setting $RSREF_O$ back to the input value $RSREF_M$.

Algorithm 250 illustrated in FIGS. 5A–5C assumes that the manual road speed override mode (i.e. steps 266–268 and 284–296), the GPS mode (steps 270–272), the proximity sensing mode (steps 274–276) and the signal transceiver mode (steps 278–280) are not simultaneously active, and the maximum road speed override value $RSREF_O$ is accordingly set as described. The present invention contemplates, however, that each of these modes may alternatively be simultaneously active, in which case algorithm 250 should be modified accordingly. One preferred technique for doing so requires setting the maximum road speed override value to a minimum (or maximum) of the maximum road speed values resulting from each of the foregoing operational modes. Those skilled in the art will recognize that other known software techniques may be used to achieve the same result. In any case, modification of algorithm 250 to achieve such results would be a mere mechanical step for a skilled software programmer.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected.

What is claimed is:

1. A system for temporarily increasing a maximum road speed of a vehicle driven by an internal combustion engine, comprising:

a road speed governor;

a first road speed limit associated with said road speed governor;

a second road speed limit associated with said road speed governor, said second road speed limit higher than said first road speed limit; and means for temporarily increasing a maximum road speed limit of said road speed governor from said first road speed limit to said second road speed limit.

2. The system of claim 1 wherein said means for temporarily increasing said maximum road speed limit includes means responsive to a request for road speed governor override operation for producing an override signal, said means for temporarily increasing said maximum road speed limit increasing said maximum road speed limit of said road speed governor from said first road speed limit to said second road speed limit in response to said override signal.

3. The system of claim 2 further including an accelerator pedal producing an accelerator pedal signal;

and wherein said means for temporarily increasing said maximum road speed limit includes means for temporarily increasing said maximum road speed limit of said road speed governor from said first road speed limit to said second road speed limit if said accelerator pedal signal is greater than an accelerator pedal threshold.

4. The system of claim 3 further including a vehicle speed sensor sensing speed of a vehicle driven by an internal combustion engine and producing a vehicle speed signal corresponding thereto;

and wherein said means for temporarily increasing said maximum road speed limit includes means for temporarily increasing said maximum road speed limit of said road speed governor from said first road speed limit to said second road speed limit as long as said vehicle speed signal exceeds a speed threshold.

5. The system of claim 1 further including an override accumulator having an accumulator value indicative of a number of miles traveled with said maximum road speed of said road speed governor limited to said second road speed limit.

6. The system of claim 5 wherein said means for temporarily increasing said maximum road speed limit includes means for temporarily increasing said maximum road speed limit of said road speed governor from said first road speed limit to said second road speed limit if said accumulator value is less than an accumulator threshold.

7. The system of claim 1 further including an override accumulator having an accumulator value indicative of an elapsed time traveled with said maximum road speed of said road speed governor limited to said second road speed limit.

8. The system of claim 7 wherein said means for temporarily increasing said maximum road speed limit includes means for temporarily increasing said maximum road speed limit of said road speed governor from said first road speed limit to said second road speed limit if said accumulator value is less than an accumulator threshold.

9. A system for temporarily increasing a maximum road speed of a vehicle driven by an internal combustion engine, comprising:

a road speed governor having a maximum road speed limit associated therewith;

an override accumulator maintaining an accumulator value indicative of one of an elapsed time spent and a distance traveled while overriding said road speed governor; and means for overriding said road speed governor and allowing road speed in excess of said maximum road speed limit if said accumulator value is below an accumulator value threshold.

10. The system of claim 9 wherein said means for overriding road speed governor includes means responsive to a request for road speed governor override operation for producing an override signal, said means for overriding said road speed governor allowing road speed in excess of said maximum road speed limit in response to said override signal.

11. The system of claim 10 further including an accelerator pedal producing an accelerator pedal signal;

and wherein said means for overriding said road speed governor includes means for overriding said road speed governor and allowing road speed in excess of said maximum road speed value if said accelerator pedal signal is greater than an accelerator pedal threshold.

12. The system of claim 11 further including a vehicle speed sensor sensing speed of a vehicle driven by an internal combustion engine and producing a vehicle speed signal corresponding thereto;

and wherein said means for overriding said road speed governor includes means for overriding said road speed governor and allowing road speed in excess of said maximum road speed limit as long as said vehicle speed signal exceeds a speed threshold.

13. A method of temporarily increasing a maximum road speed of a vehicle driven by an internal combustion engine, comprising the steps of:

normally limiting a maximum road speed to a first road speed limit;

monitoring a maximum road speed override activator; and limiting said maximum road speed to a second road speed limit greater than said first road speed limit in response to activation of said maximum road speed override activator.

14. The method of claim 13 further including the steps of:

sensing accelerator pedal position and producing an accelerator pedal signal corresponding thereto; and maintaining said limit of said maximum road speed at said second road speed limit if said accelerator pedal signal exceeds an accelerator pedal threshold.

15. The method of claim 14 further including the steps of:

sensing vehicle speed and producing a vehicle speed signal corresponding thereto; and maintaining said limit of said maximum road speed at said second road speed limit as long as said vehicle speed signal exceeds a vehicle speed threshold.

16. The method of claim 13 further including the step of accumulating a number of miles traveled with said maximum road speed limited to said second road speed limit and producing an accumulator value corresponding thereto.

17. The method of claim 16 wherein the step of limiting said maximum road speed to said second road speed limit greater than said first road speed limit in response to activation of said maximum road speed override activator is conditioned upon said accumulator value being less than an accumulator threshold.

18. The method of claim 13 further including the step of accumulating an elapsed time traveled with said maximum road speed limited to said second road speed limit and producing an accumulator value corresponding thereto.

19. The method of claim 18 wherein the step of limiting said maximum road speed to said second road speed limit greater than said first road speed limit in response to activation of said maximum road speed override activator is conditioned upon said accumulator value being less than an accumulator threshold.

* * * * *